United States Patent
Srivastava et al.

(10) Patent No.: US 12,319,851 B2
(45) Date of Patent: Jun. 3, 2025

(54) BIO-BASED ADHESIVE FOR ELECTRICAL INSULATION

(71) Applicants: INDIAN INSTITUTE OF TECHNOLOGY MADRAS (IIT MADRAS), Chennai (IN); Hitachi Energy Ltd, Zürich (CH)

(72) Inventors: Vishal Srivastava, Benares (IN); Lars Erik Schmidt, Bonn (DE); Susy Varughese, Chennai (IN); Sruthi Lalitha, Thiruvananthapuram-Kerala (IN); Abhijit Prakash Deshpande, Chennai (IN)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/725,283

(22) PCT Filed: Jan. 6, 2023

(86) PCT No.: PCT/EP2023/050227
§ 371 (c)(1),
(2) Date: Jun. 28, 2024

(87) PCT Pub. No.: WO2023/131676
PCT Pub. Date: Jul. 13, 2023

(65) Prior Publication Data
US 2024/0417610 A1    Dec. 19, 2024

(30) Foreign Application Priority Data
Jan. 7, 2022   (IN) .............................. 202241001038

(51) Int. Cl.
   *C09J 189/00*    (2006.01)
   *C09J 11/04*    (2006.01)
   *C09J 101/32*    (2006.01)

(52) U.S. Cl.
   CPC ........... *C09J 189/005* (2013.01); *C09J 11/04* (2013.01); *C09J 101/32* (2013.01); *C09J 189/00* (2013.01)

(58) Field of Classification Search
   CPC .. C09J 189/00; C09J 189/005; C09J 101/286; C09J 105/00; C08L 5/00; C08L 89/00; C08L 1/286
   See application file for complete search history.

(56) References Cited

U.S. PATENT DOCUMENTS 2,030,633 A * 2/1936 Holcomb ............. C09J 189/005
                                                           530/360
2,697,254 A   12/1954 Gordon
(Continued)

FOREIGN PATENT DOCUMENTS

CN         104985666 A     10/2015
CN         105542710 B      5/2016
(Continued)

OTHER PUBLICATIONS

Machine translation of Mo et al. (CN113249086A), publication date Aug. 13, 2021.*
(Continued)

*Primary Examiner* — Jun Li
(74) *Attorney, Agent, or Firm* — Sage Patent Group (57) ABSTRACT

The present disclosure is providing a bio-based adhesive composition which is water-based. The adhesive composition includes bioprotein, salt of carboxymethyl cellulose, gum, alkali and a solvent. The adhesive composition is prepared at ambient conditions. The adhesive composition is useful for insulation of the electric material, especially for pressboard for a transformer which requires good adhesive for imparting good mechanical and electrical strength.

13 Claims, 4 Drawing Sheets

Comparison of flexural strength of pressboards laminated using casein formulations and soy protein formulations with that of commercial glue.

(56) References Cited

U.S. PATENT DOCUMENTS

| | | | |
|---|---|---|---|
| 2,754,240 A | 7/1956 | Kinney | |
| 3,058,836 A | 10/1959 | Julius | |
| 4,046,955 A * | 9/1977 | Bye | C09J 189/00 |
| | | | 428/920 |
| 4,810,445 A | 3/1989 | Lamb, Sr. et al. | |
| 5,455,066 A | 10/1995 | Broich et al. | |
| 11,072,731 B2 * | 7/2021 | Parker | B32B 37/10 |
| 2005/0282988 A1* | 12/2005 | Li | C09J 5/00 |
| | | | 527/200 |
| 2014/0148532 A1* | 5/2014 | Omura | C09J 11/06 |
| | | | 524/72 |
| 2022/0340790 A1* | 10/2022 | Zurutuza Elorza | B32B 7/10 |
| 2024/0245826 A1* | 7/2024 | Piluso | A61L 31/145 |

FOREIGN PATENT DOCUMENTS

| | | | | |
|---|---|---|---|---|
| CN | 105754546 A | | 7/2016 | |
| CN | 105969303 A | | 9/2016 | |
| CN | 106398641 A | | 2/2017 | |
| CN | 106800914 A | * | 6/2017 | |
| CN | 106811172 A | | 6/2017 | |
| CN | 107090271 A | | 8/2017 | |
| CN | 107459964 A | | 12/2017 | |
| CN | 107722870 A | | 2/2018 | |
| CN | 107868651 A | | 4/2018 | |
| CN | 108084959 A | | 5/2018 | |
| CN | 108219743 A | | 6/2018 | |
| CN | 113249086 A | | 8/2021 | |
| CN | 114407161 A | * | 4/2022 | |
| GB | 1125926 A | | 9/1968 | |
| JP | 2014240448 A | | 12/2014 | |
| JP | WO2016208490 A1 | * | 3/2018 | |
| KR | 100402359 B1 | * | 5/2005 | |
| KR | 101889258 B1 | | 9/2018 | |
| WO | WO-2014186937 A1 | * | 11/2014 | A61K 35/618 |

OTHER PUBLICATIONS

Machine translation of Gao (WO2014186937), publication date Nov. 27, 2014.*
International Search Report and Written Opinion of the International Preliminary Examining Authority, International Application No. PCT/EP2023/050227, mailed Nov. 17, 2023, 9 pages.
International Preliminary Report on Patentability, International Application PCT/EP2023/050227, mailed Feb. 26, 2024, 8 pages.
Bull H B, et al. "The pH of urea solutions", Archives of Biochemistry and Biophysics, Academic Press, US, vol. 104, No. 2, XP027115163, Aug. 5, 1963, 8 pages.

* cited by examiner

Figure 1. Test specimen dimensions for lap shear test according to ASTM- D2339 – 98

Figure 2. Comparison of adhesion strength of pressboards laminated using casein formulations and soy protein formulations with that of commercial glue.

Figure 3. Test specimen dimensions for flexural test according to IEC 60763-2

Figure 4. Comparison of flexural strength of pressboards laminated using casein formulations and soy protein formulations with that of commercial glue.

Figure 5. Comparison of shear thinning behavior of representative compositions of a) casein b) soy protein(SPI) formulations with commercial glue Figure 6. Comparison of the oil absorption capacity of pressboards bonded using different protein-based adhesive formulations and commercial adhesive.

Figure 7. Comparison of the moisture absorbed by pressboards bonded using different protein formulations and commercial adhesive as a function of time.

BIO-BASED ADHESIVE FOR ELECTRICAL INSULATION

CROSS-REFERENCE TO RELATED APPLICATIONS

This application is a 35 U.S.C. § 371 national stage application of PCT International Application No. PCT/EP2023/050227 filed on Jan. 6, 2023, which in turn claims priority to Indian patent application No. 202241001038, filed on Jan. 7, 2022, the disclosures and content of which are incorporated by reference herein in their entireties.

TECHNICAL FIELD

The present disclosure relates generally to the field of adhesives. More specifically the disclosed subject matter relates to bio-based adhesives composition that are particularly well suited for electrical insulation industry. The present disclosure is further concerned with the method of preparing and the uses of such bio-based adhesive compositions.

BACKGROUND

Adhesive compositions, the bio-based and synthetic alternatives thereof, find many industrial uses. Adhesives are used in the industry producing corrugated box board, paper bags, paper boxes, in carton sealing or case sealing, in book-binding or tube winding, in wallpaper adhesives, in the production of laminated paper board, gummed tape or paper, envelope adhesives, bottle labelling and in textile sizing.

One important field is electrical insulation of the electric material wherein specific adhesives are used. Further, pressboard for transformer also require good adhesive for imparting good mechanical strength.

WO2012/040189 is directed to multilayer panels and to their methods of construction, and more particularly to acoustic, thermal and/or structural panels constructed at least partially from green waste material constituents and biodegradable polymeric compositions containing protein in combination with green strengthening agents. WO2012/040189 discloses an adhesive composition comprising of casein/soy protein, carboxymethyl cellulose (CMC); gum tragacanth and sodium hydroxide. However, there is no explicit disclosure on any electrical insulation properties for this adhesive.

KR1018122030000 relates to an eco-friendly, inorganic, and flame-retardant adhesive composition. The eco-friendly, inorganic, and flame-retardant adhesive composition includes: 45 wt % of water; 5 wt % of polyvinyl alcohol (PVA); 16 wt % of magnesium chloride ($MgCl_2$); 16 wt % of talc; 2 wt % of dextrins; 2 wt % of polyacrylamide (PAM); 1 wt % of an acetic acid ($CH_3COOH$); 8 wt % of glue; 2 wt % of casein; 1 wt % of turpentine; and 2 wt % of carboxymethyl cellulose (CMC). According to KR1018122030000, the eco-friendly, inorganic, and flame-retardant adhesive composition can be mixed with a base material such as a recycled plate, wood plate, or foamed Styrofoam material to be molded in the form of a panel, thereby being formed in a desired shape. The molded panel is a flame-retardant material with excellent thermal performance used to prevention emission of harmful gas in case of fire.

US20180208817A1 discloses protein adhesive compositions contain a protein-bonding agent and a plant protein composition, such as isolated water-soluble protein fraction or ground plant meal obtained from plant biomass. The protein-bonding agent can be an anhydride compound, carboxylic acid compound, carboxylate salt compound, or combination thereof. The plant protein composition is advantageous because it is prepared from plant biomass, a renewable feedstock that is generally a waste by-product of the agricultural industry.

US20180208817A1 provides an adhesive composition comprising: (a) an isolated water-soluble protein fraction; and (b) at least 0.1% (w/w) of a protein-bonding agent selected from the group consisting of an anhydride compound, carboxylic acid compound, carboxylate salt compound, and combinations thereof. The adhesive composition may further comprise water to produce a liquid adhesive composition that is particularly useful in bonding together lignocellulosic materials.

U.S. Pat. No. 5,455,066 discloses an adhesive based on casein, water-soluble extenders, natural or synthetic resin acids, resin alcohols or resin esters, and an alcohol. The adhesive has specific amounts of these ingredients which leads to a viscosity of the adhesive which is temperature dependent. The adhesive is particularly useful in the labelling of bottles wherein the surface of the bottles is wet and cold.

Lamination of pressboards (a cellulose-based substrate) used for insulating transformer components is a special case of adhesive application where high electrical strength is required for the laminates. Pressboards and laminated pressboards are studied, in general, with a focus on their mechanical and electrical properties. The individual contribution of the adhesive layer holding these substrates to mechanical and electrical behavior is not yet explored. Therefore, there is a need to develop a suitable adhesive composition which can meet the requirement to be used in electrical insulation, more particularly for lamination of pressboards used in transformer. Further, recent environmental concerns and regulatory requirements emphasize the need for adhesive compositions that are environmentally friendly and suitable.

SUMMARY

The disclosed subject matter involves protein-based adhesive formulation which is water-based. It does not require any organic solvent or harmful chemicals as in the case of synthetic polymer-based adhesives such as polyester. The required flow properties of the composition are achieved without compromising on the mechanical and adhesive strength by adding certain polysaccharides (bio-polymers). A bio-polymer (polysaccharide) was used as the binder. The adhesive composition is prepared at ambient conditions.

Accordingly, an aspect of the present disclosure is to provide an adhesive composition comprising:
 a. bioprotein;
 b. Salt of carboxymethyl cellulose;
 c. Gum;
 d. Alkali; and
 e. solvent.

In another aspect of the disclosed subject matter, the adhesive composition comprises bioprotein which is selected from histone, bovine serum albumin, casein, soy protein isolate, gluten protein or combination thereof. Preferably, bioprotein is casein, soy protein isolate or combination thereof.

In one of the aspects, bioprotein is present in an amount of 8 to 30 wt. % and bio-protein works is an adhering agent in the adhesive composition.

In another aspect of the disclosed subject matter, the adhesive composition comprises salt of carboxymethyl cellulose which is selected from sodium, ammonium, aluminum, or potassium. Preferably, salt of carboxymethyl cellulose is sodium.

In one of the aspects, salt of carboxymethyl cellulose is present in an amount of 0.80-10 wt. % in the adhesive composition.

In another aspect of the disclosed subject matter, the adhesive composition comprises gum which is selected from gum tragacanth (GT), gum karaya (GK), gum arabic, xanthan gum or pectin or combination thereof. Preferably, gum is selected from gum tragacanth (GT) or gum karaya (GK).

In one of the aspects, gum is present in an amount of 0.80-10 wt. % in the adhesive composition.

In another aspect of the disclosed subject matter, the adhesive composition comprises alkali which is selected from ammonium hydroxide, borax, sodium carbonate, trisodium phosphate or sodium hydroxide. Preferably, alkali is sodium hydroxide.

In one of the aspects, alkali is present in an amount of 4 wt. % and alkali work as a pH modifier in the adhesive composition.

In another aspect of the disclosed subject matter, water is a solvent. The solvent is present in an amount of 75-90%.

In yet another aspect of the adhesive composition having one of the following characteristics:
a flexural strength of at least 65 MPa
an electrical breakdown strength >4 KV/mm
Viscosity measured using MCR 301 Anton Paar rheometer at 25° C.-100-$10^7$ cP, and
an adhesion strength of at least 8 MPa In one of the aspects, the adhesive composition is applied in electrical insulation, particularly for pressboard for electrical transformer.

DETAILED DESCRIPTION

It is to be understood that the present disclosure is not limited in its application to the details of composition set forth in the following description. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. Before the present disclosure is described in greater detail, it is to be understood that disclosed subject matter is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosed subject matter. The upper and lower limits of these smaller ranges may independently be included in the smaller ranges and are also encompassed within the disclosed subject matter, subject to any specifically excluded limit in the stated range. Where the stated range includes one or both of the limits, ranges excluding either or both of those included limits are also included in the disclosed subject matter.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

For convenience, certain terms used in the specification, examples, and appended claims are collected in this section.

As used herein, the term 'compound(s)' comprises the compounds disclosed in the present disclosure.

Each embodiment is provided by way of explanation of the disclosed subject matter and not by way of limitation of the present disclosure. In fact, it will be apparent to those skilled in the art that various modifications and variations can be made to the compounds, compositions and methods described herein without departing from the scope or spirit of the disclosed subject matter. For instance, features illustrated or described as part of one embodiment can be applied to another embodiment to yield a still further embodiment. Thus, it is intended that the present disclosure includes such modifications and variations and their equivalents. Other objects, features, and aspects of the present disclosure are disclosed in or are obvious from, the following detailed description. It is to be understood by one of ordinary skill in the art that the present discussion is a description of exemplary embodiments only and is not to be construed as limiting the broader aspects of the present disclosure.

The adhesives used in electrical industries need to show desired electrical properties along with the necessary adhesion strength and flow properties. Viscosity of adhesives is an important factor which controls the coating process of adhesives on substrates. It can affect the spreading and absorption of adhesives especially on porous substrates.

The failure at the adhesive layer itself can make the whole system fail due to mechanical or electrical breakdown. Hence, designing and controlling the properties of adhesive layers is crucial.

Casein (a natural polymer) and polyester (a synthetic polymer) are the adhesives currently being used in electrical industries to laminate pressboards. Polyester needs organic solvents which are harmful for the environment when released at impermissible levels whereas casein adhesives are water-based and hence eco-friendly. Casein adhesives are preferred over polyester adhesives also because of its oil permeability as the insulations are immersed in oil for transformer applications.

The dielectric strength of an insulating material determines the capacity of the material to withstand or resist the flow of electric charges through it. The dielectric strength of pressboard and oil should be similar which could otherwise cause dielectric failure during passage of electric charges. The dielectric strength ratio of pressboard:oil is about 2:1 which necessitates a high oil permeability of the insulation boards. The permeation of oil throughout the pressboards helps in a uniform charge distribution and hence reduces chances of dielectric failure. Casein being a protein is an amphiphilic polymer which can assist in oil permeability due to the availability of non-polar hydrophobic groups in it. In spite of its advantages over polyester, casein adhesive needs improvement in terms of the mechanical properties. The mechanical strength of pressboards laminated using these casein-based adhesive is inferior to that using polyester adhesives.

Moisture resistance is another essential property for the transformer components as it otherwise causes accelerated ageing due to dielectric losses. Delamination upon curing is another problem to be considered while formulating an adhesive.

Rheology or flow property is an important aspect for adhesives which is important at all stages of adhesive use such as preparation, storage and application. Solvent-based adhesives are expected to show a shear thinning behavior so that it can be easily stored as well as easily coated on surfaces with the application of shear force. In this disclosure, protein formulations were developed with improved adhesion strength, high mechanical and electrical strength, and improved rheological properties.

Bio-polymers such as proteins are of interest due to the following reasons: (a) they are natural polymers and hence biodegradable, (b) water-based systems, hence avoiding the emission of harmful gases during curing unlike in the case of polyester resin using organic solvents (c) proteins being amphiphilic polymers can simultaneously assist in moisture resistance/oil permeability as well as adhesion to cellulosic substrates as needed for laminated transformer components. Therefore, the adhesive composition is developed in view of above parameters.

EXAMPLES

Non-limiting examples of adhesive composition of the present disclosure are provided in the following tables.

Commercial grade protein powders are used to prepare the formulations. Hammerstein grade casein (from bovine milk) and soy protein isolate purchased from MP Biomedicals India Pvt. Ltd. (Mumbai, India) are used for preparing the formulations. Sodium salt of carboxy methyl cellulose (CMC) is purchased from CDH Pvt. Ltd. (New Delhi, India). Gum tragacanth (GT) is obtained from CDH Pvt. Ltd. (New Delhi, India). Gum Karaya (GK) is obtained from Sigma Aldrich (Bangalore, India). Sodium hydroxide is purchased from Merck Specialties Private Limited (Mumbai, India). Deionized water (Milli-Q water) is used for all the preparation of all the adhesive composition.

The protein dispersions of definite concentrations are prepared by dispersing weighed quantity of protein powder in 1 N sodium hydroxide solution. For example, to prepare 100 ml of 10 wt % protein dispersion, 10 g of protein powder is dispersed in 100 ml of 1 N sodium hydroxide solution. The dispersions are mixed using a magnetic stirrer for 2 h at 25° C. Protein:CMC mixture of the ratio 10:1 is prepared by adding the required amount of CMC to 10 wt % casein/SPI dispersion and mixing it using a magnetic stirrer for 2 h. Protein:GT and Protein:GK mixtures of different ratios are also prepared by following the same protocol. For example, 100 ml of casein:GT 1:1 formulation is prepared by adding 10 g of GT to 100 ml of 10 wt % casein dispersion.

Protein:CMC:GT and Protein:CMC:GK mixtures of different ratios were prepared by adding the required amount of gum tragacanth or gum karaya to protein:CMC mixture of 10:1 composition. For example, 100 ml of casein:CMC:GT formulation was prepared by adding 1 g of GT to 100 ml of casein:CMC formulation. The mixtures were further mixed by magnetic stirring at 25° C. for 1 h after the addition of gum tragacanth/gum karaya.

The composition of some of the formulations based on total weight is as follows. The solvent has 4 wt % of sodium hydroxide (4 g in 100 g water)

Protein: 8.62%, CMC: 0.86%, GT: 4.31%, solvent: 86.21% Protein: 15%, CMC: 2.5%, GT: 2.5%, solvent: 80%

Protein: 8.93%, CMC: 0.89%, GK: 0.89%, solvent: 89.29%
Protein: 10%, CMC: 10%, GT: 1%, Solvent: 79%
Protein: 20%, CMC: 2.5%, GT: 2.5%, solvent: 75%
Protein: 8.33%, GT: 8.33%, solvent: 83.34%.
Protein: 8.93%, GK: 1.79%, solvent: 89.28%.
Protein: 8.33%, CMC: 8.33%, solvent: 83.34%

The adhesive formulations consist of (the composition is given on total weight basis):
a) a protein such as casein or soy protein as the main adhering agent: 8.3-30%
b) a bio-polymer such as carboxymethyl cellulose (CMC): 0.86-10%
c) a natural gum such as gum tragacanth (GT) or gum karaya (GK): 0.86-10%
d) solvent to disperse the bio-polymers: 75-90%
e) pH modifier such as sodium hydroxide (pH of adhesive: 11-13)

Commercial adhesive used for comparison with the protein-based formulations of this disclosure is a casein-based adhesive (2628-N, Pro-glue A/S) with the following specifications. It was provided by Hitachi-ABB India Ltd. (Vadodara, Gujarat).

Viscosity: 1750-2250 mPa·s Brookfield (RVI) s4/h20 v.25° C.
pH: 8.0
Dry solid content: 33%
Binder: Natural polymers
Solvent: Water
Working temperature: 5-30° C.

The adhesive composition is tested on following parameters:

Adhesion Strength

Figure 1:
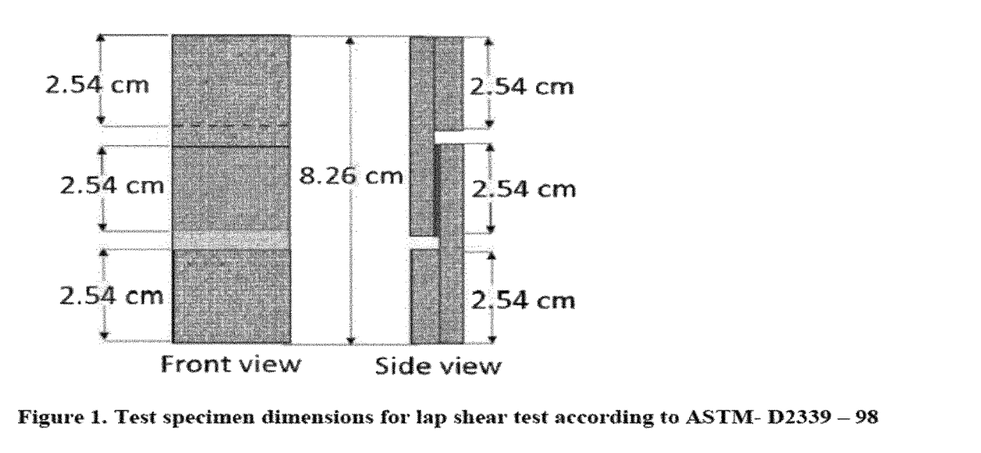
FIG. 1 illustrates test specimen dimensions for lap shear test according to ASTM-D2339-98.

The test specimens (pressboards) are pre-conditioned and tested according to ASTM D2339-98. The pressboards are adhered using the 200-300 g/m² of adhesive formulation and hot pressed at 80° C. for 30 min. Lap shear strength of the laminated pressboards characterizing the adhesive strength of the formulations were estimated from lap shear test. The lap shear tests were carried out according to ASTM D2339-98. The test specimen dimensions are given in FIG. 1.

Figure 2:
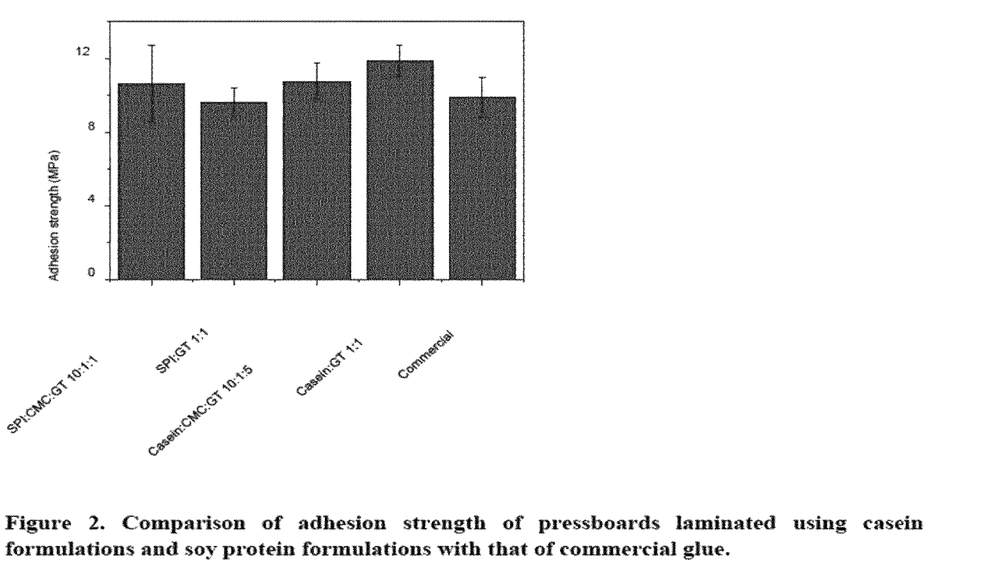
FIG. 2 illustrates comparison of adhesion strength of pressboards laminated using casein formulations and soy protein formulations with that of commercial glue.

The adhesion strength of the adhesive composition with binder content higher than half of protein content was found to be higher than the commercial adhesive currently being used (2628-N, Proglue A/S). Meanwhile, soy protein formulations with binder content as low as 1/20 times the protein content itself showed adhesive strength as comparable to commercial glue. It is also interesting to note that the protein formulation can work with the addition of binder (natural gum) alone which can control both the adhesion property and viscosity. The results of representative formulations are compared in FIG. 2. The protein-based adhesive composition developed in this disclosure can provide high adhesion strength which is comparable to that of commercial adhesive (with solid content ~33%) at solid contents as low as 10 wt %.

Flexural Strength

Figure 3:
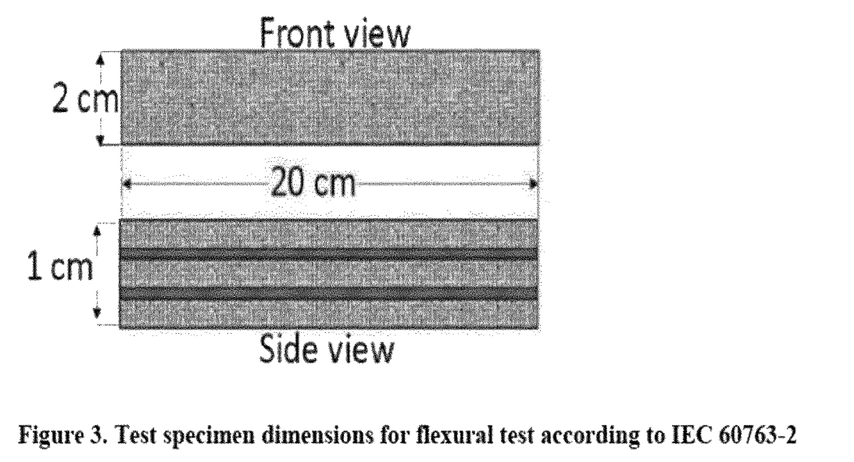
FIG. 3 illustrates test specimen dimensions for flexural test according to IEC 60763-2.
Figure 4:
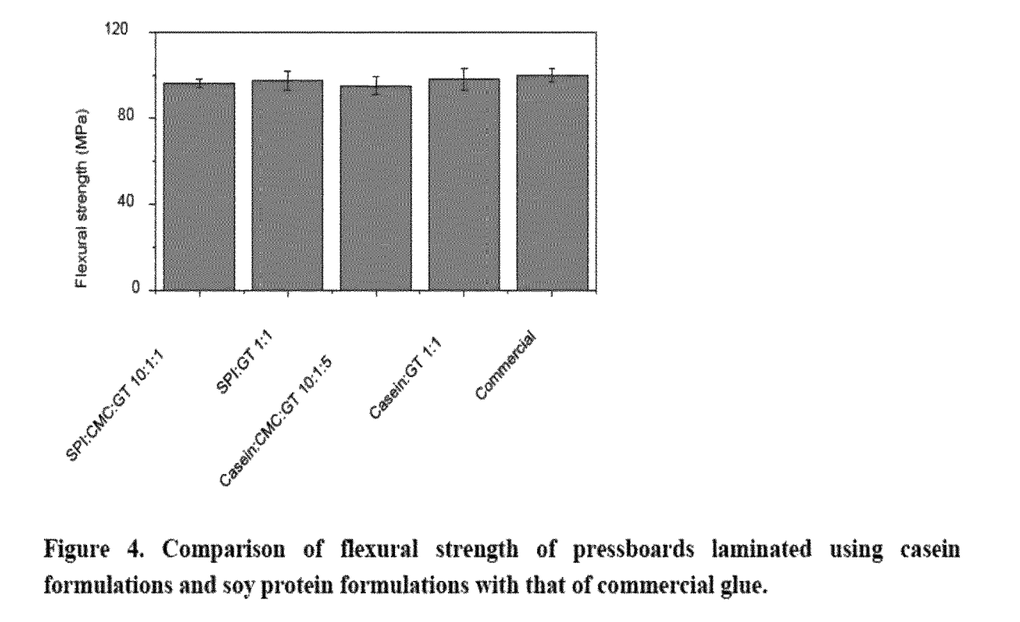
FIG. 4 illustrates comparison of flexural strength of pressboards laminated using casein formulations and soy protein formulations with that of commercial glue.
Figure 5:
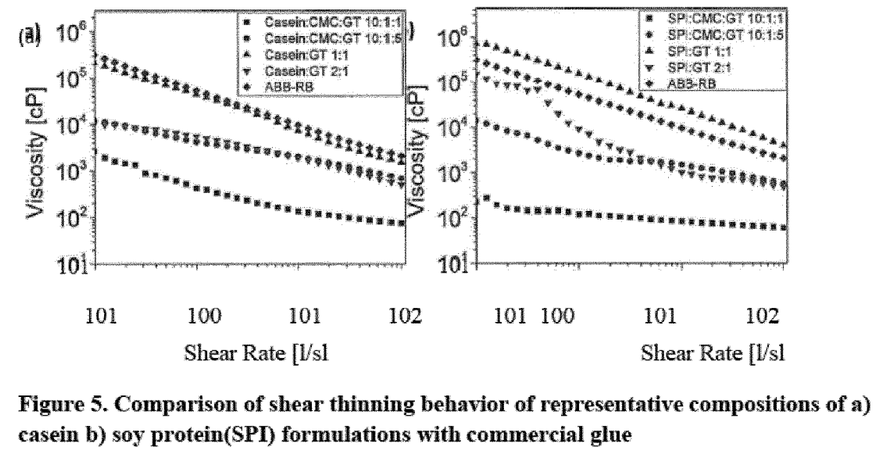
FIG. 5 illustrates comparison of shear thinning behavior of representative compositions of a) casein b) soy protein (SPI) formulations with commercial glue.

The test specimens are pre-conditioned and tested according to IEC 60763. The pressboards are adhered using 200-300 g/m² of adhesive composition and hot pressed at 80° C. for 30 min. The flexural strength characterizing the mechanical strength of laminated pressboards is estimated according to IEC 60763-2. The test specimen dimensions are given in FIG. 3. Some representative formulations with comparable flexural strength of commercial glue (2628-N, Proglue A/S) are shown in FIG. 4. These adhesive compositions provide high flexural strength which is comparable to that of commercial adhesive at comparatively lower solid content (~10 wt %).

Electrical Breakdown Strength

The pressboards laminated using these formulations are studied for their electrical strength in oil according to IEC 60763-2. The casein and SPI formulations shows electrical breakdown strength which is comparable or higher than that of commercial casein adhesive. The results of representative formulations are summarized in Table 1.

TABLE 1

Electrical breakdown strength (in oil at 25° C.) of pressboards bonded using adhesive composition. The testing was performed as per Method 2 of IEC 60763-2.

| Sample | Electrical breakdown strength (kV/mm) |
|---|---|
| Casein:CMC:GK 1:1 | 4.49 ± 0.21 |
| Casein:CMC:GT 10:1:5 | 3.84 ± 0.44 |
| Casein:GK 1:1 | 4.24 ± 0.27 |
| Casein:GT 1:1 | 3.96 ± 0.37 |
| SPI:CMC:GK 1:1 | 4.73 ± 0.22 |
| SPI:CMC:GT 10:1:5 | 4.67 ± 0.31 |
| SPI:GK 1:1 | 3.83 ± 0.56 |
| SPI:GT 1:1 | 4.67 ± 0.31 |
| Commercial | 4.72 ± 0.18 |

Rheology of Adhesive Formulations

The adhesive formulations are expected to show a shear thinning behavior. The adhesives should have high viscosity on storage (representing low shear rate) and low viscosity for coating on the substrates (representing shear rates ~1000 $s^{-1}$). Hence, solvent-based adhesive formulations are expected to have a shear thinning behavior. Shear thinning index described by Carreau-Yasuda model characterizes the shear thinning property of fluids as given in Equation 1.

$$\eta = \frac{\eta_0 - \eta_\infty}{(1 + (\lambda_r \dot{\gamma})^a)^{\frac{n-1}{a}}} + \eta_\infty \quad (1)$$

Where $\eta$ is the viscosity and $\dot{\gamma}$ is the shear rate. $\eta_0$ and $\eta_\infty$ are the zero shear and infinite shear viscosity and n and $\lambda_r$ are the power law index and relaxation time, respectively. n is the shear thinning index and values of n<1 characterizes the shear thinning behavior. The viscosity data of the protein-based formulations were fit to this model to obtain the n value. All the protein-based formulations show a shear thinning behavior as summarized in Table 3.

TABLE 3

Shear thinning index of the protein-based adhesive formulations

| Sample | n |
|---|---|
| Casein:CMC:GT 10:1:5 | 0.57 |
| Casein:CMC:GK 10:1:1 | 0.05 |
| Casein:GK 1:1 | 0.02 |
| Casein:GT 1:1 | 0.02 |
| SPI:GT 1:1 | 0.02 |
| SPI:GK 1:1 | 0.06 |
| SPI:CMC:GT 10:1:1 | 0.30 |
| SPI:CMC:GK 10:1:1 | 0.15 |
| Commercial adhesive | 0.04 |

Moreover, the formulations have viscosity comparable or less than commercial glue (2628-N, ProGlue A/S) which will assist the spreading/coating of samples over pressboards. The range of viscosity of the protein-based adhesive formulations developed in this disclosure is given in Table 4.

TABLE 4

Viscosity of the adhesive formulations compared to commercial adhesives

| Sl. No. | Sample | Viscosity (×10$^5$ cP) |
|---|---|---|
| 1 | Casein-based formulations | 0.001-100 |
| 2 | SPI-based formulations | 0.001-100 |
| 3 | Commercial glue | 0.01-30 |

Solvent-based adhesives with very low viscosity (<100 cP) are found to mostly imbibe into the porous substrate (pressboard). Hence, the formulations are designed to have a higher viscosity so as to get an optimum spreading and imbibition. From Table 5, it is evident that casein or CMC or gum dispersions at low concentrations cannot form a good adhesive formulation in terms of either adhesion strength or viscosity. Protein dispersions when modified with CMC and gum or gum alone can form formulations with adhesion strength and viscosity which are comparable or higher than that of commercial glue. Hence, the modification forms a synergetic composition of natural polymers. The addition of CMC can form formulations of high adhesion strength at comparatively lower viscosity as shown in Table 5. This makes it easier to process or handle these protein-based formulations during application. The adhesive composition can be chosen according to the viscosity required during the coating process of adhesives.

TABLE 5

Comparison of the adhesion strength and viscosity of some protein-based formulations

| Sample | Solid content (wt %) | Adhesion strength | Viscosity (×10$^5$ cP) |
|---|---|---|---|
| Casein 10 wt %: | 10 | 0.54 ± 0.18 | 0.00003-0.00006 |
| CMC 1 wt %: | 1 | 6.26 ± 2.02 | 0.00003-0.01 |
| GK 1 wt %: | 1 | 2.46 ± 1.23 | 0.0004-0.84 |
| GK 10 wt %: | 10 | 8.40 ± 0.86 | 0.005-2.78 |
| Casein:GK 1:1 (Cas 8.33%, GK 8.33%, water 83.34%) | 16.66 | 9.35 ± 3.46 | 0.002-64.20 |
| Casein:CMC:GK 10:1:5 (SPI 8.97%, CMC 0.89%, GK 0.45%, water 89.69%) | 10.31 | 11.34 ± 0.67 | 0.014-34.80 |
| Commercial (solid content 33%, water 67%) | 33 | 9.9 ± 1.09 | 0.02-28.97 |

The addition of GK in the formulation increases the adhesion strength significantly. This is evident from the comparison of representative formulations given in Table 6. The adhesion strength per unit weight of pressboards bonded using protein-based formulations developed in this study are higher than that of commercial casein adhesive. For example, it is double when GK is used with protein but quadruples when both CMC and GK are present in the protein formulations.

TABLE 6

Comparison of the adhesion strength per unit weight of pressboards bonded using different adhesive composition

| Sample | Adhesion strength/ unit weight |
|---|---|
| Casein:GK 1:1 (Cas 8.33%, GK 8.33%, water 83.34%) | 0.6 |
| Casein:CMC:GK 10:1:5 (SPI 8.97%, CMC 0.89%, GK 0.45%, water 89.69%) | 1.1 |
| Commercial (solid content 33%, water 67%) | 0.3 |

Oil Absorption Property

Pressboards used for the insulation of transformer components are required to possess high oil permeability since the transformer parts are immersed in mineral oil for heat transmission and insulation. Pressboards (size: 10×20×0.6 cm) bonded using the protein formulations developed in this study were tested for their oil absorption capacity by immersing in mineral oil at 25° C. until it reaches equilibrium. The amount of oil absorbed by the pressboards is calculated using the following equation:

$$\% \text{ Oil absorbed} = \frac{m_t - m_0}{m_0} \times 100$$

where $m_t$ is mass of pressboards at any time instant and $m_0$ is mass of pressboards at time t=0.

Figure 6:
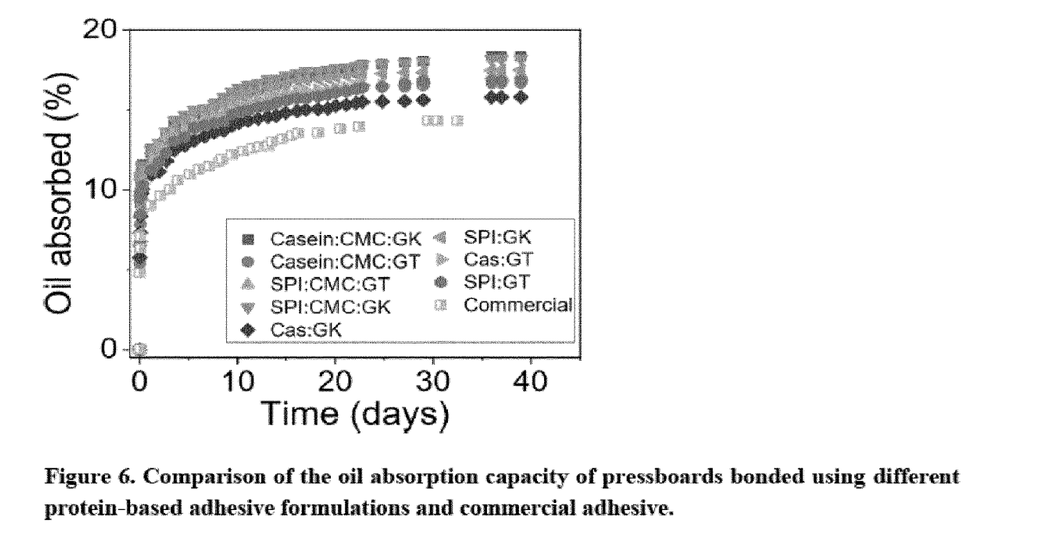
FIG. 6 illustrates comparison of the oil absorption capacity of pressboards bonded using different protein-based adhesive formulations and commercial adhesive.
Figure 7:
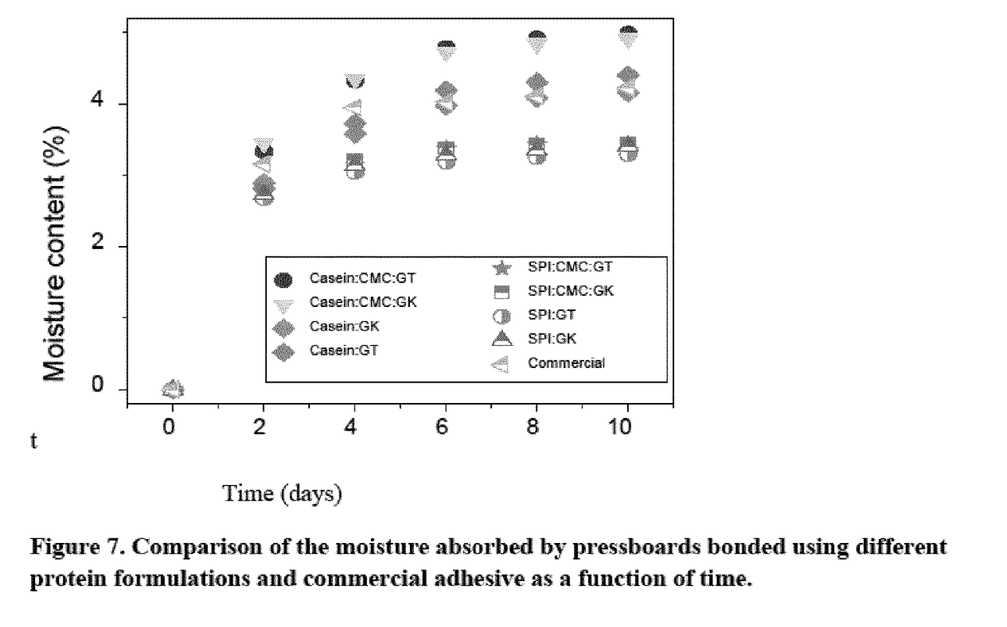
FIG. 7 illustrates comparison of the moisture absorbed by pressboards bonded using different protein formulations and commercial adhesive as a function of time.

The oil absorption capacity was found to be higher than that of pressboards bonded using commercial casein adhesive as shown in FIG. 6. This shows that the protein-based formulations developed in this study can be used for oil-type power transformers.

Moisture Resistance

Moisture in pressboards decreases the dielectric strength of the insulation. The cellulose material also gets degraded which accelerates ageing at elevated temperatures. Consequently, both mechanical properties and dielectric strength of pressboards are affected by the increase of moisture content. Therefore, it is important to monitor and control the amount of moisture present in the bonded pressboards.

The moisture absorption of pressboards (size: 10×20×0.6 cm) bonded using adhesives composition are studied by storing the samples in a humidity chamber at 25° C. and 50% RH and monitoring the increase in moisture content by gravimetric analysis carried out at regular intervals. The percentage moisture content is calculated form the following equation:

$$\% \text{ Moisture content} = \frac{m_t - m_0}{m_0} \times 100$$

where $m_t$ is mass of pressboards at any time instant and $m_0$ is mass of pressboards at time t=0.

It is observed that the moisture content of pressboards bonded using the protein formulations are comparable or lesser than the moisture absorption capacity of pressboards bonded using commercial adhesive.

This study developed certain protein-based formulations with low solid content which have comparable or better mechanical, electrical, oil absorption and moisture resistance properties.

We claim:

1. An adhesive composition comprising:
   a. bioprotein in an amount of 8 to 30 wt. % based on the weight of the adhesive composition, wherein the bioprotein is selected from histone, bovine serum albumin, casein, soy protein isolate, gluten protein, or combination thereof;
   b. salt of carboxymethyl cellulose;
   c. gum;
   d. alkali selected from ammonium hydroxide, borax, sodium carbonate, trisodium phosphate, or sodium hydroxide; and
   e. solvent being water in an amount of 75-90 wt. % based on the weight of the adhesive composition, and
      wherein the adhesive composition is free of an organic solvent and exhibits a flexural strength of at least 65 MPa.

2. The adhesive composition as claimed in claim 1, wherein bioprotein is casein, soy protein isolate or combination thereof.

3. The adhesive composition as claimed in claim 1, wherein bioprotein is an adhering agent.

4. The adhesive composition as claimed in claim 1, wherein salt of carboxymethyl cellulose is selected from sodium, ammonium, aluminum, or potassium.

5. The adhesive composition as claimed in claim 4, wherein salt of carboxymethyl cellulose is sodium.

6. The adhesive composition as claimed in claim 1, wherein salt of carboxymethyl cellulose is present in an amount of 0.80-10 wt. %.

7. The adhesive composition as claimed in claim 1, wherein gum is selected from gum tragacanth (GT), gum karaya (GK), gum arabic, xanthan gum, pec tin, or a combination thereof.

8. The adhesive composition as claimed in claim 7, wherein gum is selected from gum tragacanth (GT) or gum karaya (GK).

9. The adhesive composition as claimed in claim 1, wherein gum is present in an amount of 0.80-10 wt. %.

10. The adhesive composition as claimed in claim 1, wherein alkali is sodium hydroxide.

11. The adhesive composition as claimed in claim 1, wherein alkali is present in an amount of 4 wt. %.

12. The adhesive composition as claimed in claim 1, wherein alkali is a pH modifier.

13. The adhesive composition as claimed in claim 1 having one of the following characteristics:
   an electrical breakdown strength >4 KV/mm, determined according to IEC 60763-2, or
   an adhesion strength of at least 8 MPa, determined according to ASTM D2339-98.

* * * * *